(12) United States Patent
Paul et al.

(10) Patent No.: US 9,436,573 B2
(45) Date of Patent: Sep. 6, 2016

(54) MULTIFUNCTIONAL I/O APPARATUS

(71) Applicant: Endress + Hauser GmbH + Co. KG, Maulburg (DE)

(72) Inventors: Tobias Paul, Schopfheim (DE); Ralph Stib, Schonau (DE); Armend Zenuni, Lorrach (DE)

(73) Assignee: Endress + Hauser GmbH & Co. KG, Maulburg (DE)

( * ) Notice: Subject to any disclaimer, the term of this patent is extended or adjusted under 35 U.S.C. 154(b) by 58 days.

(21) Appl. No.: 14/380,006

(22) PCT Filed: Jan. 31, 2013

(86) PCT No.: PCT/EP2013/051869
§ 371 (c)(1),
(2) Date: Aug. 20, 2014

(87) PCT Pub. No.: WO2013/127591
PCT Pub. Date: Sep. 6, 2013

(65) Prior Publication Data
US 2015/0019763 A1    Jan. 15, 2015

(30) Foreign Application Priority Data
Feb. 28, 2012  (DE) .................. 10 2012 101 615

(51) Int. Cl.
*G06F 3/00*   (2006.01)
*G06F 11/30*  (2006.01)
*G05B 19/042* (2006.01)

(52) U.S. Cl.
CPC ....... *G06F 11/3051* (2013.01); *G05B 19/0423* (2013.01)

(58) Field of Classification Search
None
See application file for complete search history.

(56) References Cited

U.S. PATENT DOCUMENTS

| | | | | |
|---|---|---|---|---|
| 4,771,403 A | * | 9/1988 | Maskovyak | G05B 19/0423 710/14 |
| 5,479,618 A | * | 12/1995 | Van de Steeg | G05B 19/0423 700/23 |
| 6,308,231 B1 | * | 10/2001 | Galecki | G05B 19/054 702/127 |
| 6,320,494 B1 | * | 11/2001 | Bartels | H04B 3/548 340/538.11 |
| 7,028,105 B2 | | 4/2006 | Dute | |
| 7,271,752 B2 | | 9/2007 | Stoll | |

FOREIGN PATENT DOCUMENTS

| | | |
|---|---|---|
| DE | 102005055546 A1 | 5/2007 |
| DE | 102006052291 A1 | 5/2008 |
| EP | 1500992 B1 | 1/2005 |
| WO | 0208867 A2 | 1/2002 |

OTHER PUBLICATIONS

International Search Report, EPO, The Netherlands, Sep. 27, 2013.
English Translation of the International Preliminary Report on Patentability, WIPO, Geneva, Sep. 12, 2014.

* cited by examiner

*Primary Examiner* — Elias Mamo
(74) *Attorney, Agent, or Firm* — Bacon & Thomas, PLLC

(57) ABSTRACT

Multifunctional I/O apparatus having one connection terminal with two connections and an electronic circuit, which with the assistance of a plurality of settable operating states detects an active input signal or passive input signal applied on the two connections of the connection terminal or controls/switches an externally driven load.

8 Claims, 6 Drawing Sheets

MULTIFUNCTIONAL I/O APPARATUS

TECHNICAL FIELD

The invention relates to a multifunctional input/output apparatus, subsequently referred to herein as an I/O apparatus, which has an electronic circuit and a connection terminal with two connections.

BACKGROUND DISCUSSION

Known from the state of the art is an I/O apparatus, which by means of three different connection terminals can implement the following three functions: firstly, switch, respectively control, a connected, externally driven load; second, detect the presence of a passive input signal on a second connection terminal; and third, detect the presence of an active input signal on a third connection terminal. This means that, for implementing these three different functions, thus one output function and two input functions, three connection terminals are needed with a total of five connections on a circuit board. The result is a large space requirement on the circuit board, which, in turn, leads to increased costs in the construction of the I/O apparatus on a circuit board and then later causes also higher inventory costs. Therefore, it is desirable that the space required for the construction of an I/O apparatus on a circuit board be kept as small as possible.

Furthermore, I/O apparatuses are known, which at two connection terminals with three connections can detect at the first connection terminal a direct voltage signal (DC) or an alternating voltage signal (AC) as active input signal and at the second connection terminal a passive input signal. These active or passive input signals can, however, only be detected over a small voltage range, which is a disadvantage of the state of the art.

SUMMARY OF THE INVENTION

An object of the invention is to provide a multifunctional I/O apparatus requiring as little space as possible on a circuit board.

The object is achieved by a multifunctional I/O apparatus comprising: one connection terminal with two connections; and an electronic circuit, which with the assistance of a plurality of settable operating states detects an active input signal or a passive input signal applied on the two connections of the connection terminal or controls/switches an externally driven load, wherein the electronic circuit comprises: at least one switch element, which is so operable by a first control signal of a logic unit that it short circuits or isolates the two connections of the connection terminal; a signal generator, which is so operable by a second control signal of the logic unit that in the presence of the active input signal on the two connections of the connection terminal it generates a status signal and forwards such to the logic unit; an energy source, which is so operable by a third control signal of the logic unit that in the presence of the passive input signal on the two connections of the connection terminal, it provides energy required for operation of the signal generator; a protective apparatus, which is connected between the signal generator and the energy source; and the logic unit, which depending on the respectively set operating state of the electronic circuit distinguishes between a first operating state, a second operating state and a third operating state and, with the assistance of the first control signal, the second control signal and the third control signal, activates the switch element, the signal generator and the energy source in accordance with the set operating state.

According to the invention, the space requirement for the multifunctional I/O apparatus on the circuit board is thus especially reduced, because the multifunctional I/O apparatus is composed of only one connection terminal composed of two connections, and the multifunctional I/O apparatus knows, respectively can implement, three different operating states, wherein each of the individual operating states has a special function. The first operating state and, thus, the first function, which with the multifunctional I/O apparatus is implemented, is to control, respectively to switch, as needed, an externally driven load connected to the connections of the connection terminal. The second operating state and, thus, the second function, which with the multifunctional I/O apparatus is implemented, is to detect the presence or lack of an active input signal on the connections of the connection terminal. The third operating state and, thus, the third function, which with the multifunctional I/O apparatus is implemented, is to detect the presence or lack of a passive input signal on the connections of the connection terminal. For implementing these different operating states, respectively the different functions, the switch element, the energy source and the signal generator are configured corresponding to the respective operating state of the logic unit.

This offers the advantage that instead of requiring a separate connection terminal for implementing each of the operating states, respectively each of the functions, one is able to use a single connection terminal (composed of two connections) for the different functions and, associated therewith, the space requirement for the construction of such a multifunctional I/O apparatus on the circuit board can be minimized.

An advantageous embodiment of the apparatus of the invention provides a rectifier apparatus, which in the presence an alternating voltage as passive input signal or active input signal, rectifies the applied passive input signal or active input signal and supplies the rectified passive input signal or active input signal to the downstream signal generator. This offers the advantage that it is possible, by introducing a rectifier apparatus, to detect both dc signals as well as also alternating voltage signals on the connections of the connection terminal.

An advantageous embodiment of the apparatus of the invention provides that, in the first operating state, the signal generator and the energy source are inactive and the logic unit switches the switch element as needed, in order to control the externally driven load connected between the two connections of the connection terminal.

Another advantageous embodiment of the apparatus of the invention provides that, in the second operating state, the switch element and the energy source are inactive and the signal generator is active, in order to detect the active input signal between the two connections of the connection terminal and with the assistance of the signal generator to generate a status signal and to supply such to the logic unit.

In an additional embodiment of the apparatus of the invention, it is provided that, in the third operating state, the switch element is inactive and the signal generator and the energy source are active, in order to detect the passive input signal between the two connections of the connection terminal and with the assistance of the signal generator to generate a status signal and to supply such to the logic unit.

According to another embodiment, the apparatus of the invention is embodied such that in the circuit branch, which has the rectifier apparatus, the signal generator and the protective apparatus, there is further provided in this circuit branch an electrical current limiting element for limiting and/or controlling electrical current. This offers the advantage that, with the assistance of the electrical current limiting element, the electrical current and, thus, the energy is limited, which comes from the active input signal and gets to the signal generator. In this way, active input signals can be detected over a broad voltage range without danger that the signal generator is overloaded and, in given cases, destroyed due to too high energy consumption.

In an additional form of embodiment of the apparatus of the invention, it is provided that the switch element and the associated first control signal are embodied redundantly. This offers the advantage that through redundancy, respectively doubling, of the switch element and of the associated first control signal, the multifunctional I/O apparatus meets the safety requirements of the SIL standard (safety integrity level), which is important in process automation.

In a last embodiment, the apparatus of the invention is embodied such that the first control signal, the second control signal, the third control signal and the status signal are isolated by means of a galvanic isolation. This offers the advantage that, because of the galvanic isolation, the multifunctional I/O apparatus can also be applied in explosion endangered regions, such as, for example, an EX zone II.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
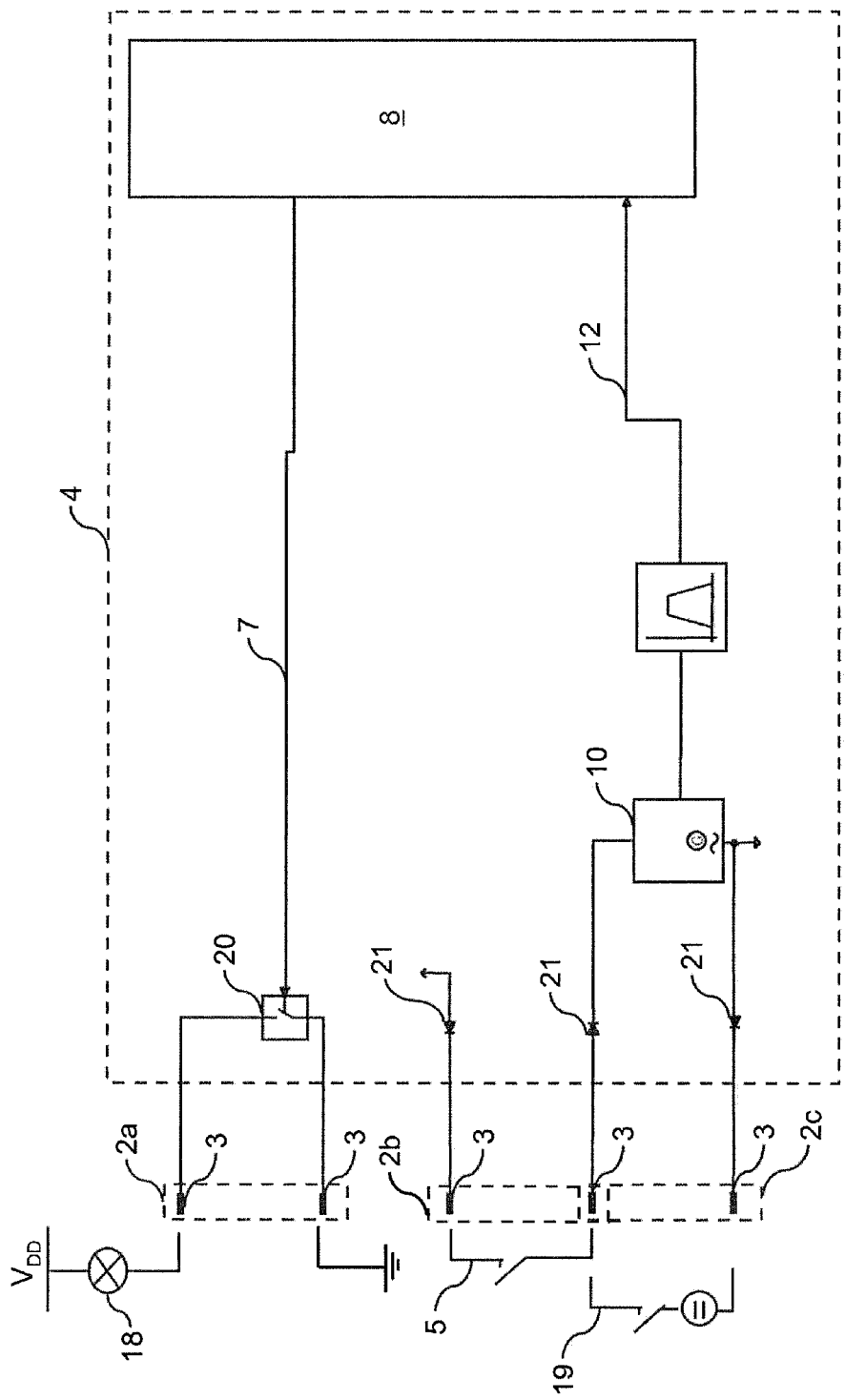
FIG. 1 is a block diagram of a conventional I/O apparatus known from the state of the art.

FIG. 1 shows a block diagram of a conventional I/O apparatus known from the state of the art. This conventional I/O apparatus is composed of three individual connection terminals 2a, 2b, 2c with a total of five connections 3 and an electronic circuit 4, wherein the middle connection terminal 2b and the lower connection terminal 2c have a shared connection 3. Electronic circuit 4 includes a relay 20, a signal generator 10, and three diodes 21, wherein the relay 20 is operated with the assistance of a first control signal 7 from logic unit 8 and the signal generator 10 reports the presence of an active input signal 19 or passive input signal 5 to the logic unit 8 with the assistance of a status signal 12. The diodes 21 in FIG. 1 serve as protection against wrong connections.

With help of the three connection terminals 2a, 2b, 2c, composed of the five connections 3, the following functions are implemented: at the uppermost connection terminal 2a, a connected, externally driven load 18 is controlled, respectively switched, as needed, by means of the relay 20 and the first control signal 7 supplied by logic unit 8; at the middle connection terminal 2b, the presence or lack of a passive input signal 5 is detected; and on the lower connection terminal 2c, the presence or lack of an active input signal 19 is detected.

Figure 2:
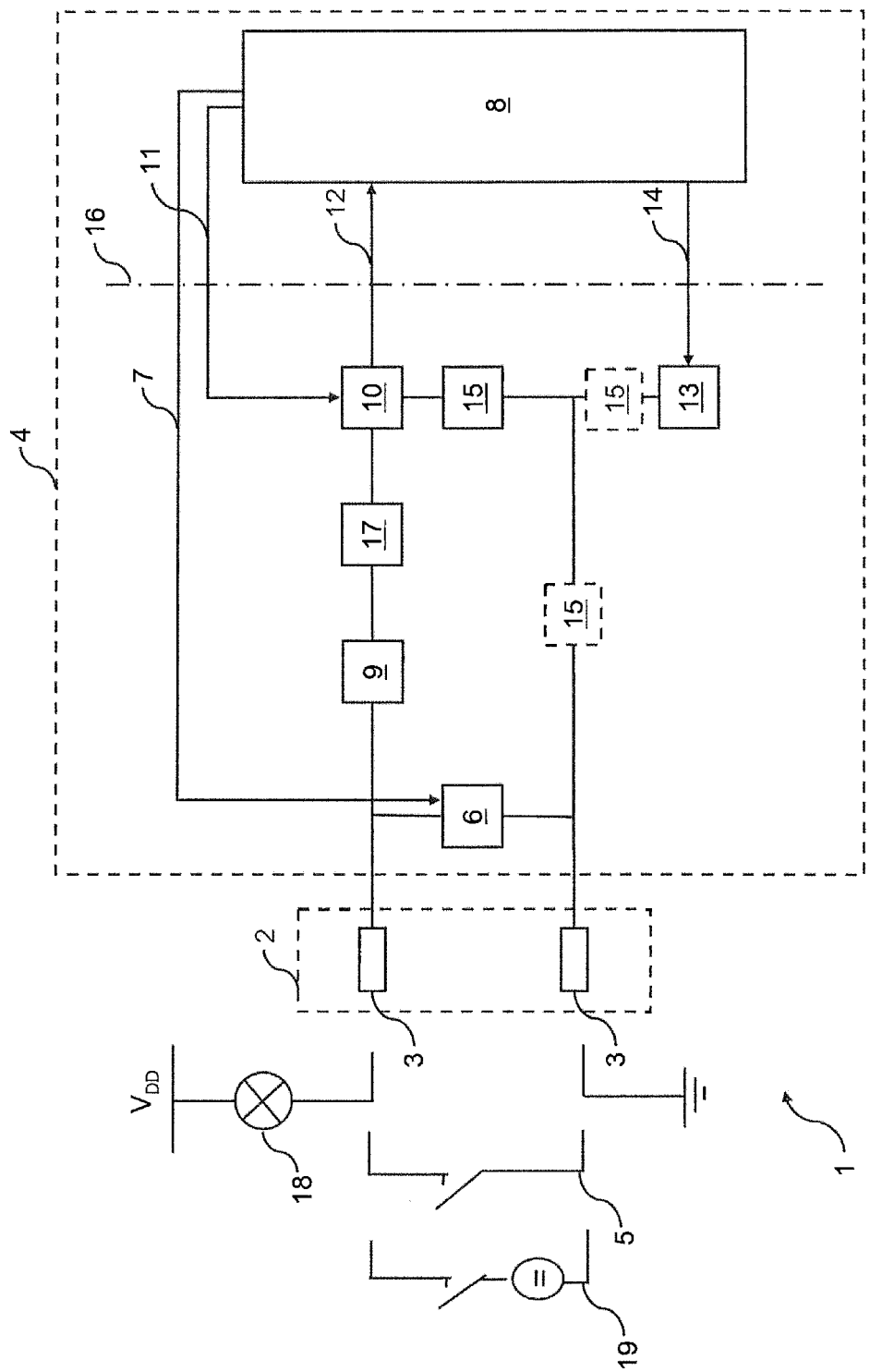
FIG. 2 is a block diagram of an embodiment of the multifunctional I/O apparatus of the invention.

FIG. 2 shows a block diagram of an embodiment of the multifunctional I/O apparatus 1 of the invention. Such is composed of a connection terminal 2 with two connections 3 and an electronic circuit 4. In such case, the connection terminal 2 serves either to control, respectively to switch, a connected, externally driven load 18 or to detect a passive input signal 5 or active input signal 19 applied to the connections 3 of the connection terminal 2. Typical examples of a connected, externally driven load 18 include: PLC, power controller, motor, pump, valve, control light, sirens or similar signal emitters.

It is to be stressed here, such as already indicated, that it can be an active input signal 19 or a passive input signal 5, which is applied to the connections 3 of the connection terminal 2. Furthermore, the active input signal 19 can be both a direct voltage signal as well as also an alternating voltage signal.

In this regard, an active input signal 19 should be able to supply the signal generator 10 with sufficient energy for its operation. A passive input signal 5 is, in contrast, not able to do this. Thus, in the case of a passive input signal 5, an additional energy source 13 is required to supply the energy necessary for operating the signal generator 10

Electronic circuit 4 is composed of a plurality of individual components. These will now be explained in greater detail The switch element 6, which typically is composed of at least one relay and is operated by means of a logic unit 8 in accordance with the operating state respectively set via the first control signal 7, serves to short circuit the two connections 3 of the connection terminal 2 or to isolate one from the other, in order so to function as a switch for an, in given cases, connected, externally driven load 18.

The rectifier apparatus 9, which typically is composed of one or more diodes, serves to rectify an active input signal 19 applied as an alternating voltage to the two connections 3 of the connection terminal 2, in order so to operate thereafter connected circuit elements for their intended purposes.

Signal generator 10, under the direction of the second control signal 11 of the logic unit in accordance with the respectively set operating state, serves in the presence of a passive input signal 5 or an active input signal 19 on the two connections 3 of the connection terminal 2 to produce a digital status signal 12 and to forward such to the logic unit 8, in order, in this way, to detect the presence or lack of a passive input signal 5 or active input signal 19.

The status signal 12, which is produced by the signal generator 10 in the presence or lack of a passive input signal 5 or active input signal 19 on the two connections 3 of the connection terminal 2 and delivered to the logic unit 8, is, such as already mentioned above, a digital signal, which can assume both a logical H-level as well as also a logical L-level.

In other words, this means that, as soon as a passive input signal 5 or active input signal 19 is present on the connections 3 of the connection terminal 2, with the assistance of the signal generator 10, a logic H-level is produced as status signal 12 and delivered to the logic unit 8. In the case, in which on the connections 3 of the connection terminal 2 no passive input signal 5 or active input signal 19 is present, a logic L-level is produced as status signal 12 and delivered to the logic unit 8. In this way, the presence or lack of a passive input signal 5 or active input signal 19 on the connections 3 of the connection terminal 2 can be detected with the assistance of the electronic circuit 4 and the logic unit 8.

The energy source 13 is activated by the logic unit 8 in the third operating state, while in all other states, thus the first operating state and the second operating state, it is deactivated. In the third operating state, the presence or lack of a passive input signal 5 on the connections of the connection terminal is detected. Since the passive input signal 5 provides no energy for operating the signal generator, the energy source 13 is required for such purpose. As soon as a passive input signal 5 is present on the connections 3 of the connection terminal 2, and, thus, a direct connection is present between the energy source 13 and the signal generator 10, energy source 13 provides the signal generator 10 with the required energy.

The protective apparatus 15, which typically is composed of at least one diode, serves to protect the signal generator 10 against improper activation during operation of the energy source 13. It is to be noted here that the protective apparatus 15 does not unavoidably have to be located at the shown position. Other possible positions are shown in FIG. 2 by the dashed boxes.

The electrical current limiting element 17 limits, respectively controls, the electrical current in the circuit branch composed of the rectifier apparatus 9, the signal generator 10 and the protective apparatus 15. In this way, energy contribution from the active input signal 19 is limited, so that active input signals 19 over a broad voltage range do not overload and, in given cases, destroy the signal generator 10. Active input signals 19 over a broad voltage range mean typically signals of 2.5V to 230V, wherein such can be both dc signals as well as also alternating voltage signals.

The logic unit 8, which typically is a microprocessor, serves so to operate the switch element 6 by means of the first control signal 7 as well as the signal generator 10 by means of the second control signal 11 and the energy source 13 by means of the third control signal 14 in accordance with the respectively set operating states that these components are active or inactive as a function of the respectively set operating state. The configuration, respectively the selection, of the respectively desired operating state can, in such case, for example, be so designed that this happens in a step preceding regular operation of the multifunctional I/O apparatus 1.

This configuration step can occur both preliminarily, i.e. before the delivery to the downstream customers, as well as also later during the regular operation of the multifunctional I/O apparatus 1, for setting the respectively desired operating state either by customers or by a service technician.

Further indicated in FIG. 2 is a galvanic isolation 16 of the first control signal 7, the second control signal 11, the third control signal 14 and the status signal 12. This galvanic isolation 16 is explored in greater detail with respect to FIG. 6.

Figure 3:
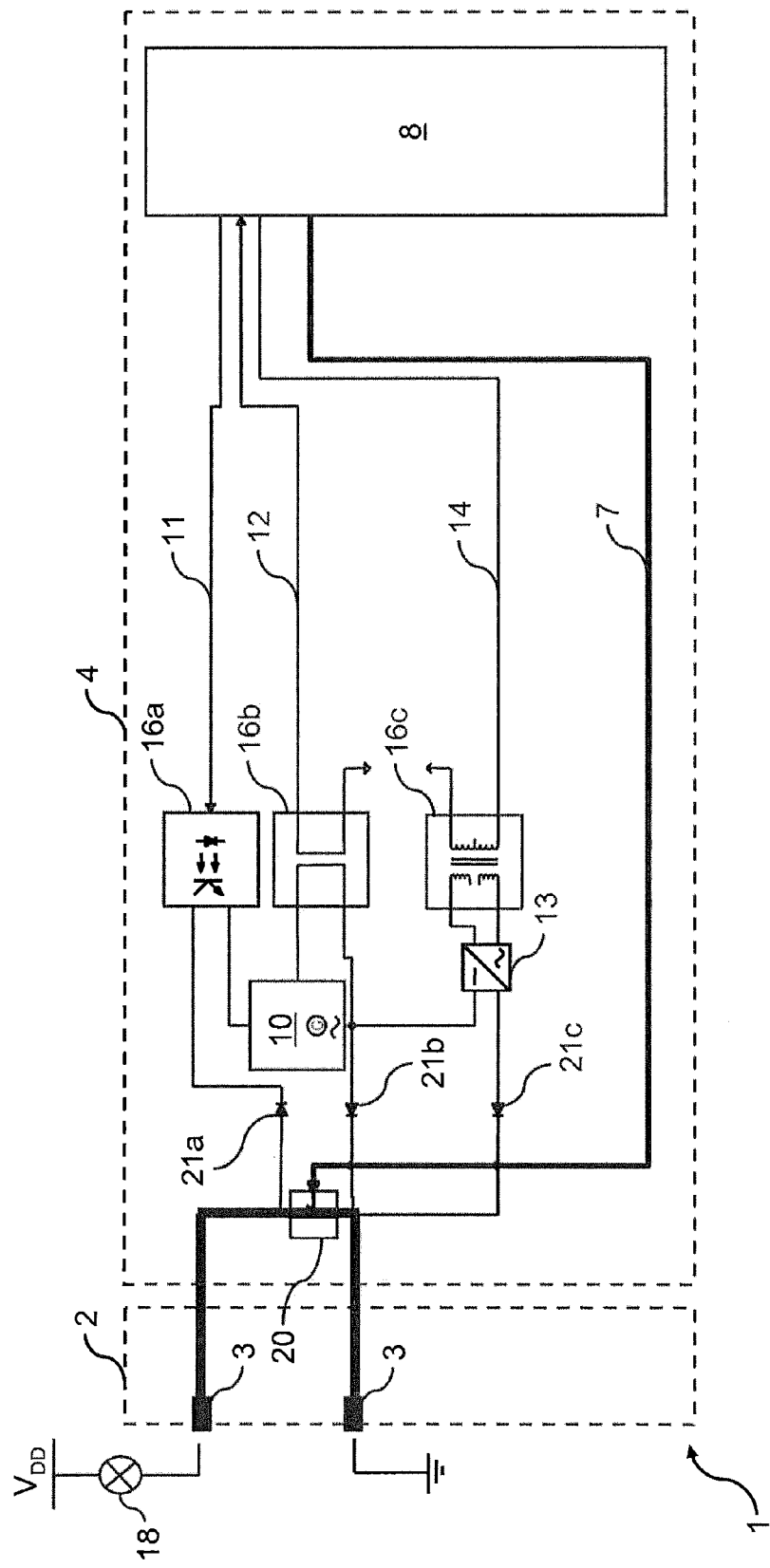
FIG. 3 is a detailed representation of the multifunctional I/O apparatus shown in FIG. 2 in the first operating state.

FIG. 3 shows a detailed representation of the multifunctional I/O apparatus of FIG. 2 in the first operating state.

In this first operating state, an externally driven load 18 connected to the connections 3 of the connection terminal 2 is controlled, respectively switched. For this, the logic unit 8 is preconfigured for the first operating state. This means that the logic unit 8 with the assistance of the second control signal 11 deactivates the signal generator 10 and with the assistance of the third control signal 14 deactivates the energy source 13.

To be noted is that the second control signal 11 from the logic unit 8 is isolated via a galvanic isolation 16a and the third control signal 14 from the logic unit 8 is isolated via another galvanic isolation 16c. This will not be explored here in greater detail, but, instead, first in the case of the description of FIG. 6.

Moreover, FIG. 3 shows three diodes 21a, 21b, 21c, wherein the diode 21a and the diode 21b serve as rectifiers and the diodes 21c and, again, diode 21b serve as protective apparatuses. This means that diode 21b serves a double function and is used both for rectification as well as also for protection.

In this way, logic unit 8 can with the assistance of the first control signal 7 open and close the relay 20 as needed and so switch, respectively control, the externally driven load. The signal path relevant for this first operating state is drawn thicker in FIG. 3.

Examples of externally driven loads include: PLC, power controller, motor, pump, valve, control light, sirens or similar signal emitters.

Figure 4:
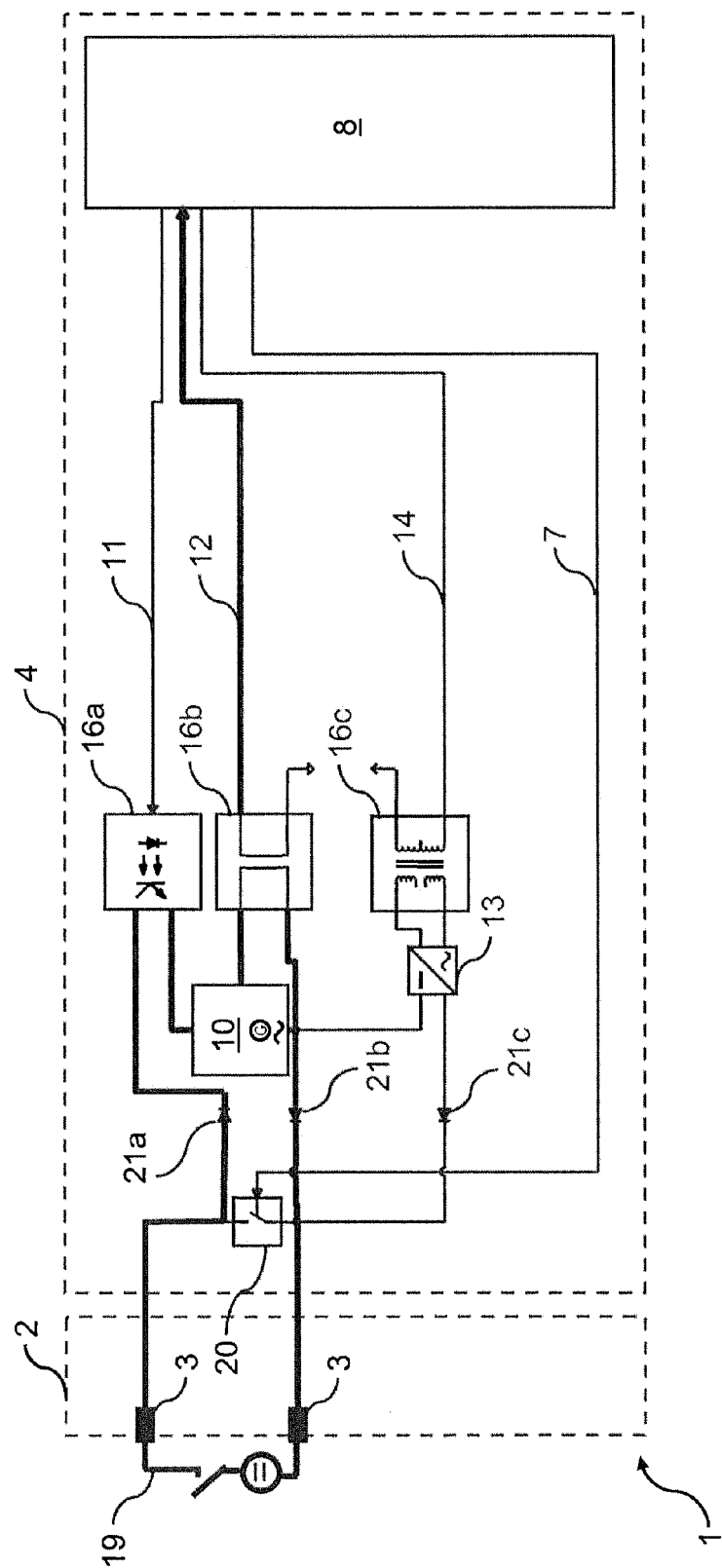
FIG. 4 is a detailed representation of the multifunctional I/O apparatus shown in FIG. 2 in the second operating state.

FIG. 4 shows a detailed representation of the multifunctional I/O apparatus shown in FIG. 2 in the second operating state. The construction of the multifunctional I/O apparatus 1 corresponds to the construction shown in FIG. 3, except that the externally driven load 18 has been replaced by an active input signal 19, since the multifunctional I/O apparatus 1 detects in the second operating state a direct voltage, or alternating voltage, signal as active input signal 19 on the connections 3 of the connection terminal 2. For this, the logic unit 8 is preconfigured for this second operating state. Again, the relevant signal paths have been drawn thicker. In this second operating state, logic unit 8 opens the relay 20 by means of the first control signal 7 and deactivates the energy source 13 by means of the third control signal 14 and simultaneously activates the signal generator 10 by means of the second control signal 11. In this way, in the case, in which an active input signal 19 is applied on the two connections 3 of the connection terminal 2, this is conveyed via the diode 21a and the diode 21b, which serve as rectifier apparatus 9, to the signal generator 10, and the signal generator 10 produces an H-level as status signal 12, which is forwarded to the logic unit 8. In this operating state, thus the second operating state, the energy required for operating the signal generator 10 is provided by the active input signal 19. Due to the diodes 21a and 21b, which serve as rectifier apparatus 9, it is insignificant whether the active input signal is a direct voltage or an alternating voltage signal, since in the case, in which it is an alternating voltage signal, such is rectified.

In the case, in which no active input signal 19 is present on the two connections 3 of the connection terminal 2, the signal generator 10 provides an L-level as status signal 12 to the logic unit 8. In this way, the logic unit 8 in the second operating state detects the presence or lack of an active input signal 19 on the connections 3 of the connection terminal 2.

Figure 5:
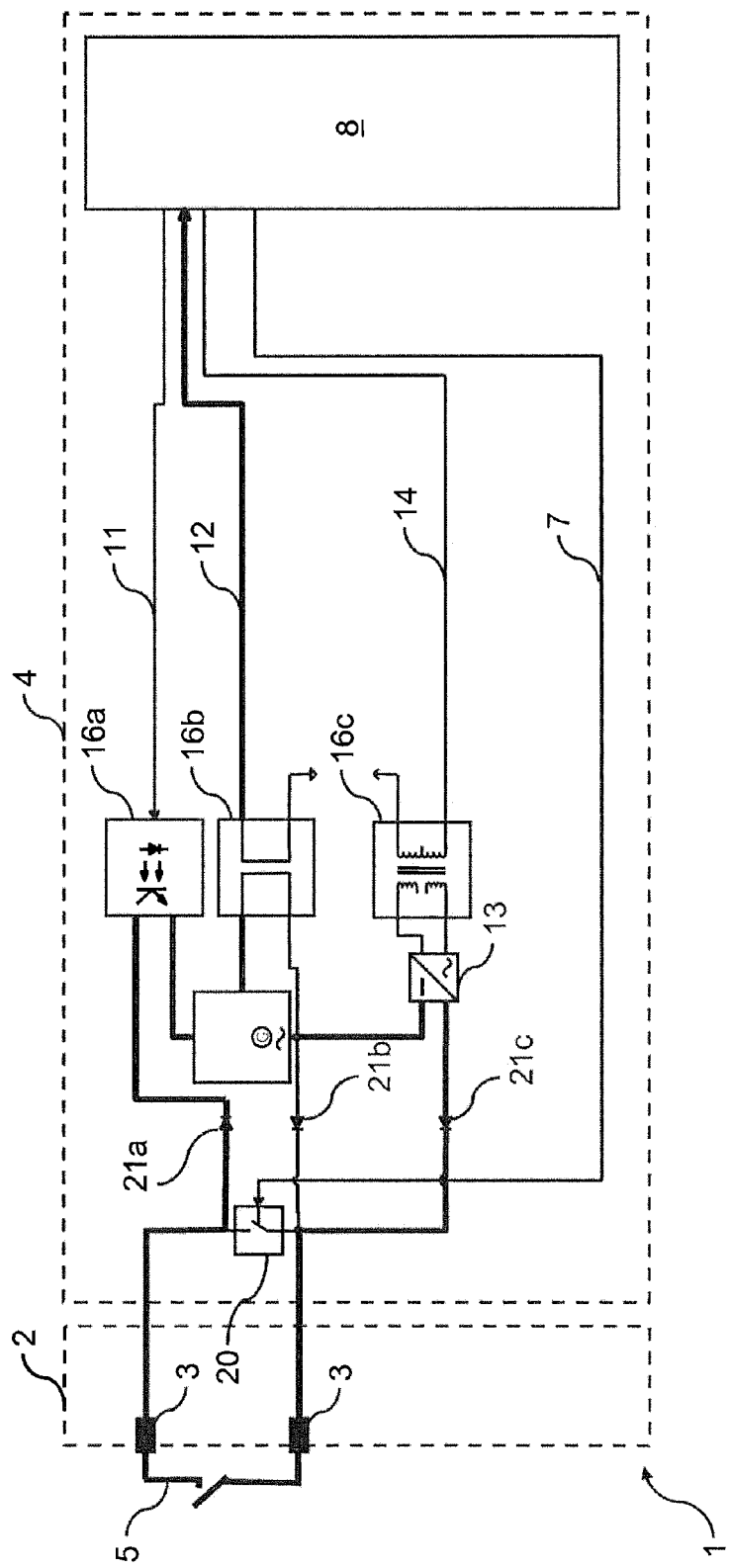
FIG. 5 is a detailed representation of the multifunctional I/O apparatus shown in FIG. 2 in the third operating state.

FIG. 5 shows a detailed representation of the multifunctional I/O apparatus of FIG. 2 in the third operating state. The construction of the multifunctional I/O apparatus 1 corresponds to the construction as presented in FIG. 3, except that the externally driven load 18 is replaced here by a passive input signal 5, since the multifunctional I/O apparatus 1 in the third operating state detects a passive input signal 5 on the connections 3 of the connection terminal 2. For this, the logic unit 8 is preconfigured for this third operating state. Again, the relevant signal paths are brought out as thicker lines. In this third operating state, the logic unit 8 deactivates the relay 20 via the first control signal 7 and activates the signal generator 10 via the second control signal 11 and the energy source 13 via the third control signal 14. In this third operating state, the energy source 13 provides the energy necessary for operating the signal generator 10, since the passive input signal 5 on the two connections 3 of the connection terminal 2 does not provides sufficient, respectively provides no, energy for operating the signal generator 10 for its intended purpose.

In the case, in which a passive input signal 5 is present on the two connections 3 of the connection terminal 2, this is conveyed via the diode 21a and the diode 21c to the signal generator 10, which produced an H-level as status signal 12 and supplies such to the logic unit 8.

As in the second operating state, also in this third operating state, in the case, in which no passive input signal 5 is present on the two connections 3 of the connection terminal 2, the signal generator 10 delivers an L-level as status signal 12 to the logic unit 8.

In this way, the logic unit 8 detects in the third operating state the presence or lack of a passive input signal 5 on the connections 3 of the connection terminal 2.

Figure 6:
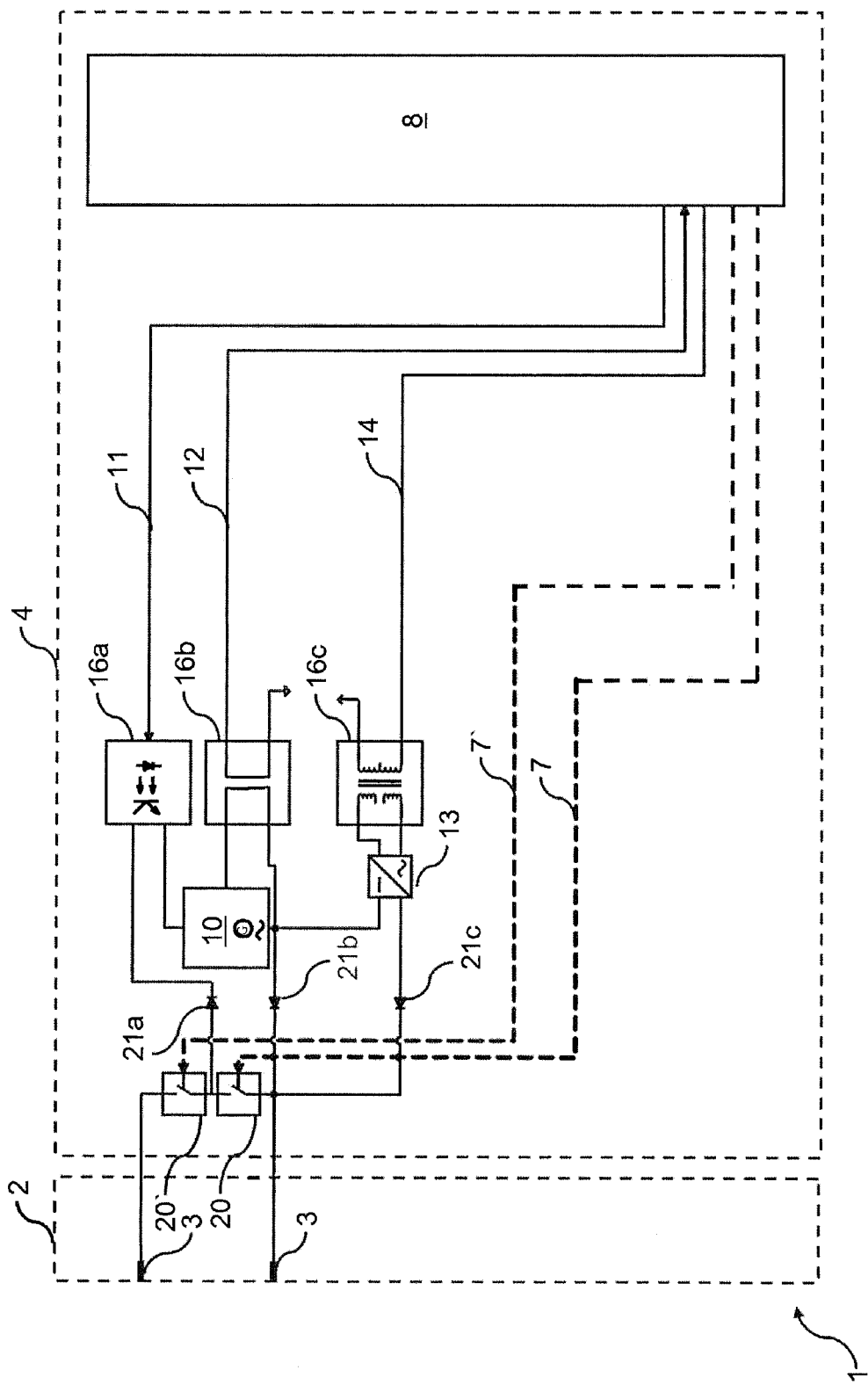
FIG. 6 is a second embodiment of the multifunctional I/O apparatus of the invention.

FIG. 6 shows a second embodiment of the multifunctional I/O apparatus of the invention. In such case, the relay 20 (which serves as switch element 6) and the associated first control signal 7 are redundantly, respectively doubly, embodied. FIG. 6 shows the redundant components, thus the relay 20' and the first control signal 7'. This redundancy has no influence on the earlier described functions of the multifunctional I/O apparatus 1, yet offers the advantage that it meets the safety requirements of the SIL standard (safety integrity level). These safety requirements are important in process automation, in order to obtain increased safety through the doubled or, in given cases, even greater provisioning, of all safety-relevant hardware and software components. Through these measures and, in given cases, supplementally by using diverse designs, it should be assured that a safety critical failure of the apparatus and the occurrence of simultaneously arising, systematic errors in the case of providing the measured value are, with high probability, excluded.

Furthermore, it is desirable to use the multifunctional I/O apparatus also in explosion-endangered regions, for example, an EX zone II. For this, it is required to isolate by means of galvanic isolation 16 all signals, which either lead to, or lead from, the logic unit. Options include to implement, by means of optical transmission, for example, an optocoupler, the galvanic isolation 16a of the second control signal 11 for controlling the signal generator, to implement the galvanic isolation 16b of the status signal 12 inductively, for example, by means of a transformer, and, by means of inductive galvanic isolation 16c, for example, a transformer, or by means of capacitive galvanic isolation 16c, for example, a charge pump, to implement the galvanic isolation of the third control signal 14 for controlling the energy source 13. The galvanic isolation of the first control signal 7 occurs in the relays 6 and 6' and is not shown in greater detail in FIG. 6.

The invention claimed is:

1. A multifunctional I/O apparatus, comprising:
one connection terminal with two connections; and
an electronic circuit, which with the assistance of a plurality of settable operating states detects an active input signal or passive input signal applied on said two connections of said connection terminal or controls/switches an externally driven load, wherein:
said electronic circuit comprises: at least one switch element, which is so operable by a first control signal of a logic unit that it short circuits or isolates said two connections of said connection terminal; a signal generator, which is so operable by a second control signal of said logic unit that in the presence of the active input signal or passive input signal on said two connections of said connection terminal it generates a status signal and forwards such to said logic unit; an energy source, which is so operable by a third control signal of said logic unit that in the presence of the passive input signal on said two connections of said connection terminal, it provides energy required for operation of the signal generator, a protective apparatus, which is connected between the signal generator and the energy source; and
said logic unit, which dependent on the respectively set operating state of said electronic circuit distinguishes between a first operating state, a second operating state and a third operating state and, with the assistance of the first control signal, the second control signal and the third control signal, activates said switch element, the signal generator and the energy source in accordance with the set operating state.

2. The apparatus as claimed in claim 1, further comprising:
a rectifier apparatus, which in the presence of an alternating voltage as passive input signal or active input signal, rectifies the applied passive input signal or active input signal and supplies the rectified passive input signal or active input signal to said signal generator connected downstream therefrom.

3. The apparatus as claimed in claim 1, wherein:
in the first operating state, said signal generator and said energy source are inactive and said logic unit switches said switch element as needed, in order to control the externally driven load connected between said two connections of said connection terminal.

4. The apparatus as claimed in claim 1, wherein:
in the second operating state, said switch element and said energy source are inactive and said signal generator is active, in order to detect the active input signal between said two connections of said connection terminal and with the assistance of said signal generator to generate a status signal and to supply such to the logic unit.

5. The apparatus as claimed in claim 1, wherein:
in the third operating state, said switch element is inactive and said signal generator and said energy source are active, in order to detect the passive input signal between said two connections of said connection terminal and with the assistance of said signal generator to generate a status signal and to supply such to said logic unit.

6. The apparatus as claimed in claim 1, wherein:
in a circuit branch, which has said rectifier apparatus, said signal generator and said protective apparatus, there is further provided in said circuit branch an electrical current limiting element for limiting and/or controlling electrical current.

7. The apparatus as claimed in claim 1, wherein:
said switch element and the associated first control signal are embodied redundantly.

8. The apparatus as claimed in claim 1, wherein:
the first control signal, the second control signal, the third control signal and the status signal are isolated by means of a galvanic isolation.

* * * * *